(12) United States Patent
Lowell et al.

(10) Patent No.: US 9,487,146 B1
(45) Date of Patent: Nov. 8, 2016

(54) TRAILER HITCH STEP APPARATUS

(71) Applicants: Richard Lowell, Lowell, OR (US); Debra Lowell, Lowell, OR (US)

(72) Inventors: Richard Lowell, Lowell, OR (US); Debra Lowell, Lowell, OR (US)

( * ) Notice: Subject to any disclaimer, the term of this patent is extended or adjusted under 35 U.S.C. 154(b) by 0 days.

(21) Appl. No.: 15/085,198

(22) Filed: Mar. 30, 2016

(51) Int. Cl.
*B60R 3/02* (2006.01)
*B60R 3/00* (2006.01)

(52) U.S. Cl.
CPC .................................. *B60R 3/007* (2013.01)

(58) Field of Classification Search
None
See application file for complete search history.

(56) References Cited

U.S. PATENT DOCUMENTS

| | | | | |
|---|---|---|---|---|
| 4,096,920 A * | 6/1978 | Heyn | ...................... | B62D 51/02 180/11 |
| 4,610,454 A * | 9/1986 | Gill | ........................... | B62B 3/18 182/15 |
| 4,726,596 A * | 2/1988 | Ulmer | ....................... | B62B 3/14 16/48 |
| 6,575,480 B2 * | 6/2003 | McKelvey | .............. | B62B 3/144 280/33.993 |
| 6,682,086 B1 | 1/2004 | Erickson | | |
| 6,851,692 B2 | 2/2005 | Mitchell | | |
| 7,081,197 B1 | 7/2006 | Davis | | |
| 8,851,495 B1 * | 10/2014 | Masanek, Jr. | ............. | B60R 3/00 280/163 |
| 2014/0183844 A1 * | 7/2014 | Iryami | .................... | B62B 3/027 280/659 |

* cited by examiner

*Primary Examiner* — John Walters
*Assistant Examiner* — Hilary L Johns
(74) *Attorney, Agent, or Firm* — Crossley & Stevenson Intellectual Property Law

(57) ABSTRACT

A trailer hitch step apparatus including a hollow square-shaped hitch sleeve, with a perimeter of a channel of the hitch sleeve substantially conforming to a perimeter of a trailer hitch receiver. A base mounting support is attached to a bottom side of the hitch sleeve. Each of a right step member and a left step member of a pair of step members is attached to a right area and a left area, respectively, of the base mounting support. Each of a right side mounting support and a left side mounting support of a pair of triangular side mounting supports is disposed on a side edge of the right step member and the left step member, respectively. The channel of the hitch sleeve is selectively slidably disposable around the trailer hitch receiver, and a tightening bolt secures the channel of the hitch sleeve around the trailer hitch receiver.

3 Claims, 4 Drawing Sheets

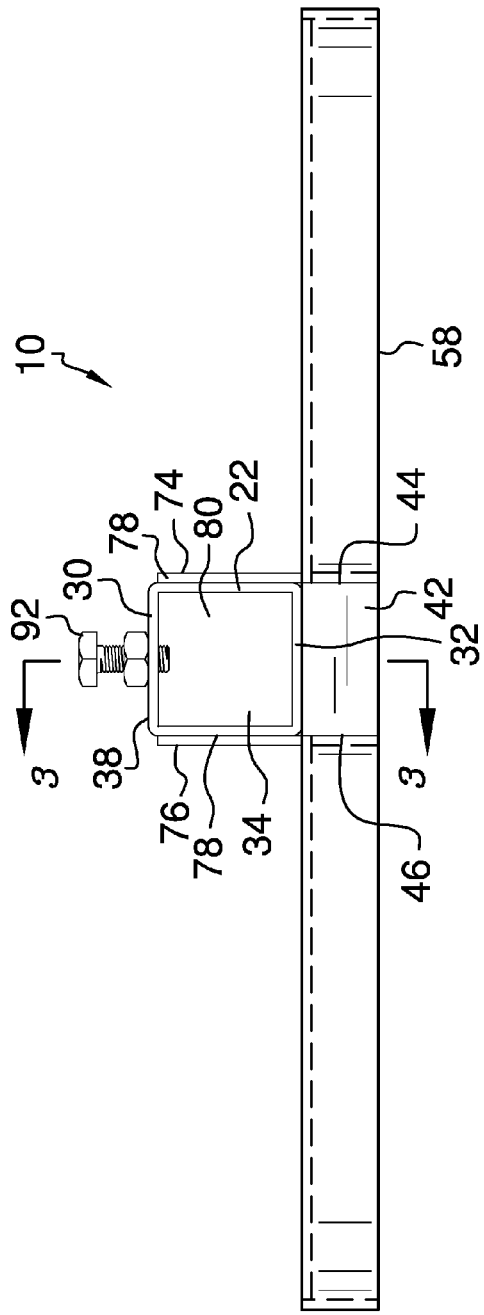
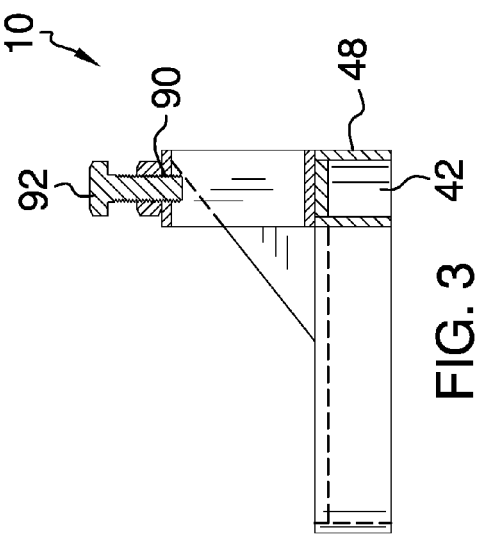

TRAILER HITCH STEP APPARATUS

BACKGROUND OF THE INVENTION

Various types of step apparatuses are known in the prior art. However, what has been needed is a trailer hitch step apparatus including a hollow square-shaped hitch sleeve, with a perimeter of a channel of the hitch sleeve substantially conforming to a perimeter of a trailer hitch receiver. What has been further needed is a base mounting support attached to a bottom side of the hitch sleeve, with each of a right step member and a left step member of a pair of step members attached to a right area and a left area, respectively, of the base mounting support, and each of a right side mounting support and a left side mounting support of a pair of triangular side mounting supports disposed on a side edge of the right step member and the left step member, respectively. Lastly, what has been needed is for the channel of the hitch sleeve to be selectively slidably disposable around the trailer hitch receiver, with a tightening bolt to secure the channel of the hitch sleeve around the trailer hitch receiver. The trailer hitch step apparatus thus provides a user with a more convenient way in which to climb in and out or access a pickup truck bed.

FIELD OF THE INVENTION

The present invention relates to step apparatuses, and more particularly, to a trailer hitch step apparatus.

SUMMARY OF THE INVENTION

The general purpose of the present trailer hitch step apparatus, described subsequently in greater detail, is to provide a trailer hitch step apparatus which has many novel features that result in a trailer hitch step apparatus which is not anticipated, rendered obvious, suggested, or even implied by prior art, either alone or in combination thereof.

To accomplish this, the present trailer hitch step apparatus includes a hollow square-shaped hitch sleeve having an open front end, an open back end, a right side, a left side, a top side, a bottom side, and a channel disposed from the back end to the front end. Each of the right side, the left side, the top side, and the bottom side has an internal surface and an external surface. A perimeter of the channel of the hitch sleeve substantially conforms to a perimeter of a trailer hitch receiver. A rectangular base mounting support is attached to the external surface of the bottom side of the hitch sleeve, with the base mounting support having a right area, a left area, and a back area. A length of the base mounting support substantially conforms to a length of the hitch sleeve, and a width of the base mounting support substantially conforms to a width of the hitch sleeve.

The trailer hitch step apparatus further includes a pair of step members including a right step member and a left step member. Each of the right step member and the left step member has a top surface, a bottom surface, and a continuous side edge having a dome-shaped outer portion, a linear inner portion, a continuous upper surface, a continuous lower surface, a front rounded corner, and a rear corner. The inner portion of the side edge of each of the right step member and the left step member is disposed on an entirety of the right area of the base mounting support and the left area of the base mounting support, respectively. The back area of the base mounting support is disposed adjacent to the rear corner of the side edge of each of the right step member and the left step member. A height of each of the right step member and the left step member is equal to a height of the base mounting support. The top surface of each of the right step member and the left step member is optionally a diamond tread plate.

Each of a right side mounting support and a left side mounting support of a pair of right angled triangular side mounting supports has an inner surface, an outer surface, a lower edge, a diagonally disposed left side edge, and a vertically disposed right side edge. The lower edge of each of the right side mounting support and the left side mounting support is disposed on the upper surface of the side edge of the right step member and the left step member, respectively, adjacent to the inner portion. The inner surface of each of the right side mounting support and the left side mounting support proximal the right side edge is disposed on the external surface of each of the right side and the left side, respectively, of the hitch sleeve. The hitch sleeve, the base mounting support, the pair of step members, and the pair of side mounting supports are optionally steel for greater durability.

A threaded aperture is medially disposed through the top side of the hitch sleeve. A tightening bolt is selectively threadably engageable within the aperture. The channel of the hitch sleeve is selectively slidably disposable around the trailer hitch receiver, and the tightening bolt selectively secures the channel of the hitch sleeve around the trailer hitch receiver when the tightening bolt is downwardly threadably engaged within the aperture. Thus, when the trailer hitch receiver is attached to an automobile, specifically a pickup truck, the trailer hitch step apparatus allows a user to more easily access the truck bed and, alternately, the compartment under the hood, using the pair of step members. Furthermore, the trailer hitch step apparatus is easily disengaged from the trailer hitch step apparatus when not in use.

Thus has been broadly outlined the more important features of the present trailer hitch step apparatus so that the detailed description thereof that follows may be better understood and in order that the present contribution to the art may be better appreciated.

BRIEF DESCRIPTION OF THE DRAWINGS

Figures

FIG. 2 is a front elevation view.

FIG. 3 is a cross-sectional view taken along line 3-3 of FIG. 2.

DETAILED DESCRIPTION OF THE DRAWINGS

Figure 1:
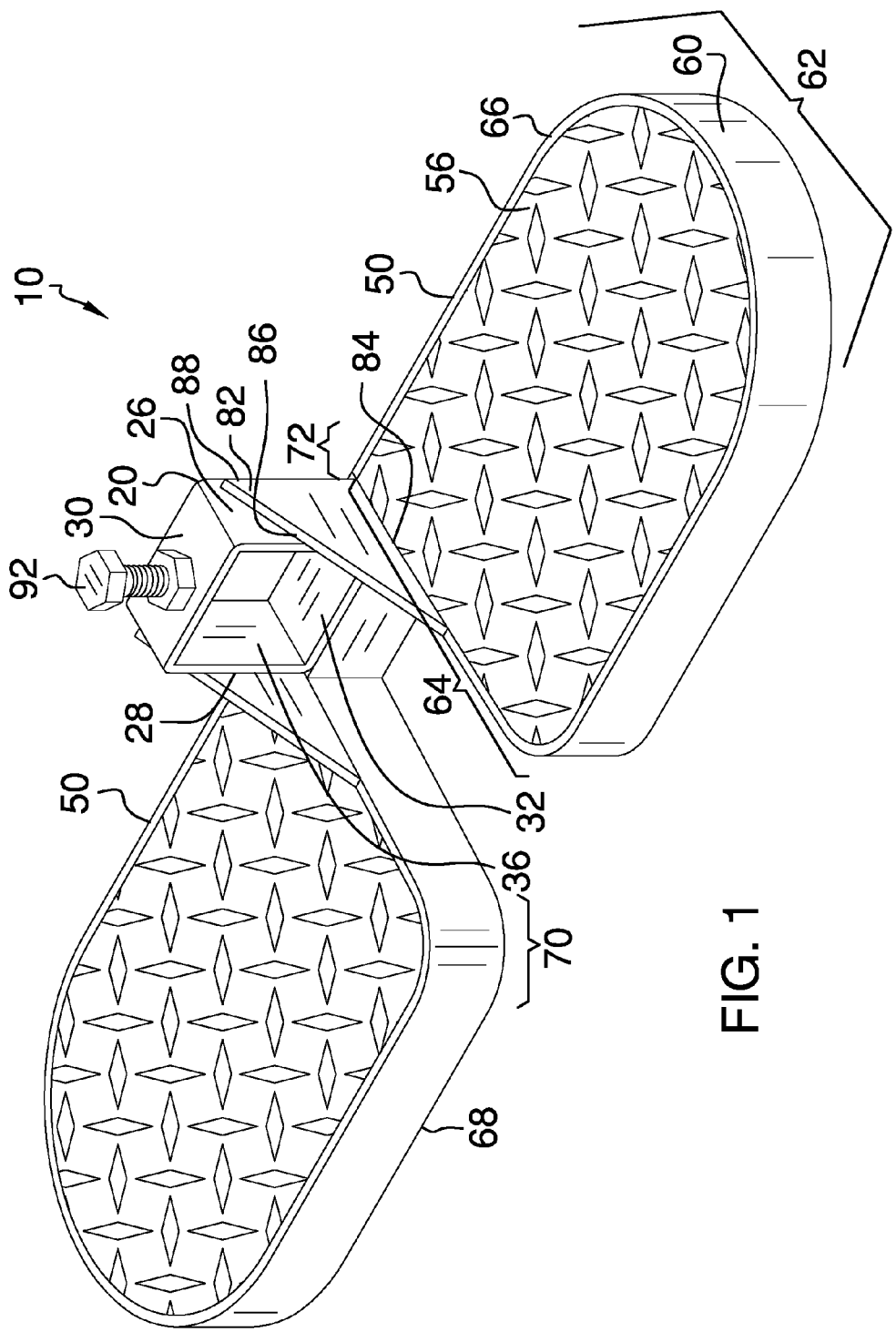
FIG. 1 is a front isometric view.
Figure 4:
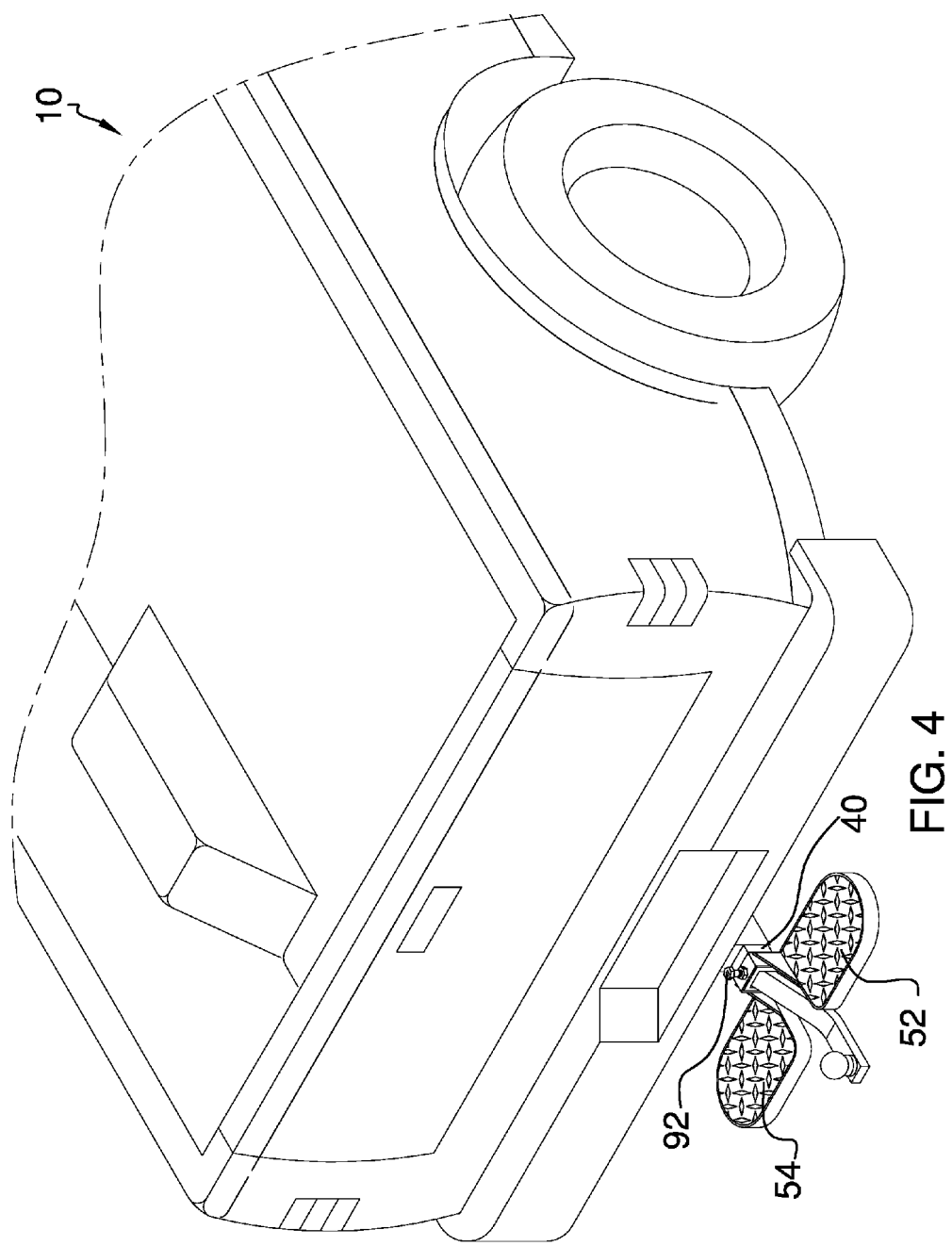
FIG. 4 is an in use view showing a hitch sleeve attached to a rear mount trailer hitch receiver.
Figure 5:
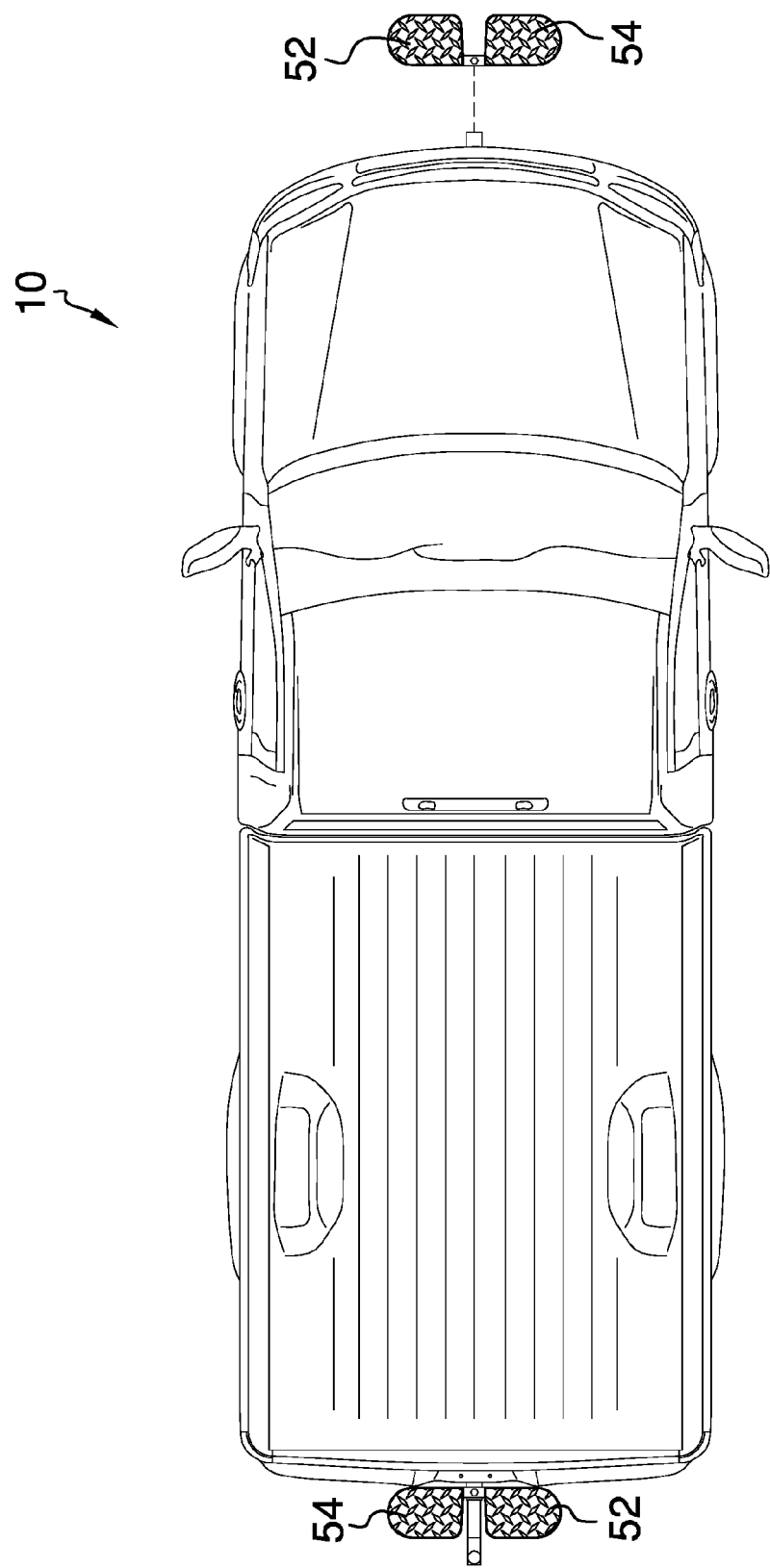
FIG. 5 is an in use exploded view showing the hitch sleeve slidably disposable around a front mount trailer hitch receiver.

With reference now to the drawings, and in particular FIGS. 1 through 5 thereof, an example of the instant trailer hitch step apparatus employing the principles and concepts of the present trailer hitch step apparatus and generally designated by the reference number 10 will be described.

Referring to FIGS. 1 through 5 the present trailer hitch step apparatus 10 is illustrated. The trailer hitch step apparatus 10 includes a hollow square-shaped hitch sleeve 20 having an open front end 22, an open back end 24, a right side 26, a left side 28, a top side 30, a bottom side 32, and a channel 34 disposed from the back end 24 to the front end 22. Each of the right side 26, the left side 28, the top side 30, and the bottom side 32 has an internal surface 36 and an external surface 38. A perimeter of the channel 34 of the hitch sleeve 20 substantially conforms to a perimeter of a trailer hitch receiver 40. A rectangular base mounting support 42 is attached to the external surface 38 of the bottom side 32 of the hitch sleeve 20, with the base mounting support 42 having a right area 44, a left area 46, and a back area 48. A length of the base mounting support 42 substantially conforms to a length of the hitch sleeve 20, and a width of the base mounting support 42 substantially conforms to a width of the hitch sleeve 20.

The trailer hitch step apparatus 10 further includes a pair of step members 50 including a right step member 52 and a left step member 54. Each of the right step member 52 and the left step member 54 has a top surface 56, a bottom surface 58, and a continuous side edge 60 having a dome-shaped outer portion 62, a linear inner portion 64, a continuous upper surface 66, a continuous lower surface 68, a front rounded corner 70, and a rear corner 72. The inner portion 64 of the side edge 60 of each of the right step member 52 and the left step member 54 is disposed on an entirety of the right area 44 of the base mounting support 42 and the left area 46 of the base mounting support 42, respectively. The back area 48 of the base mounting support 42 is disposed adjacent to the rear corner 72 of the side edge 60 of each of the right step member 52 and the left step member 54. A height of each of the right step member 52 and the left step member 54 is equal to a height of the base mounting support 42. The top surface 56 of each of the right step member 52 and the left step member 54 is optionally a diamond tread plate.

Each of a right side mounting support 74 and a left side mounting support 76 of a pair of right angled triangular side mounting supports 78 has an inner surface 80, an outer surface 82, a lower edge 84, a diagonally disposed left side edge 86, and a vertically disposed right side edge 88. The lower edge 84 of each of the right side mounting support 74 and the left side mounting support 76 is disposed on the upper surface 66 of the side edge 60 of the right step member 52 and the left step member 54, respectively, adjacent to the inner portion 64. The inner surface 80 of each of the right side mounting support 74 and the left side mounting support 76 proximal the right side edge 88 is disposed on the external surface 38 of each of the right side 26 and the left side 28, respectively, of the hitch sleeve 20. The hitch sleeve 20, the base mounting support 42, the pair of step members 50, and the pair of side mounting supports 78 are optionally steel.

A threaded aperture 90 is medially disposed through the top side 30 of the hitch sleeve 20. A tightening bolt 92 is selectively threadably engageable within the aperture 90. The channel 34 of the hitch sleeve 20 is selectively slidably disposable around the trailer hitch receiver 40, and the tightening bolt 92 selectively secures the channel 34 of the hitch sleeve 20 around the trailer hitch receiver 40 when the tightening bolt 92 is downwardly threadably engaged within the aperture 90.

What is claimed is:

1. A trailer hitch step apparatus comprising:
    a hollow square-shaped hitch sleeve having an open front end, an open back end, a right side, a left side, a top side, a bottom side, and a channel disposed from the back end to the front end, wherein each of the right side, the left side, the top side, and the bottom side has an internal surface and an external surface;
    wherein a perimeter of the channel of the hitch sleeve substantially conforms to a perimeter of a trailer hitch receiver;
    a rectangular base mounting support attached to the external surface of the bottom side of the hitch sleeve, the base mounting support having a right area, a left area, and a back area, wherein a length of the base mounting support substantially conforms to a length of the hitch sleeve, and a width of the base mounting support substantially conforms to a width of the hitch sleeve;
    a pair of step members comprising a right step member and a left step member, each of the right step member and the left step member having a top surface, a bottom surface, and a continuous side edge having a dome-shaped outer portion, a linear inner portion, a continuous upper surface, a continuous lower surface, a front rounded corner, and a rear corner, wherein the inner portion of the side edge of each of the right step member and the left step member is disposed on an entirety of the right area of the base mounting support and the left area of the base mounting support, respectively, wherein the back area of the base mounting support is disposed adjacent to the rear corner of the side edge of each of the right step member and the left step member;
    wherein a height of each of the right step member and the left step member is equal to a height of the base mounting support;
    a pair of right angled triangular side mounting supports comprising a right side mounting support and a left side mounting support, each of the right side mounting support and the left side mounting support having an inner surface, an outer surface, a lower edge, a diagonally disposed left side edge, and a vertically disposed right side edge, wherein the lower edge of each of the right side mounting support and the left side mounting support is disposed on the upper surface of the side edge of the right step member and the left step member, respectively, adjacent to the inner portion, and the inner surface of each of the right side mounting support and the left side mounting support proximal the right side edge is disposed on the external surface of each of the right side and the left side, respectively, of the hitch sleeve;
    a threaded aperture medially disposed through the top side of the hitch sleeve; and
    a tightening bolt selectively threadably engageable within the aperture;
    wherein the channel of the hitch sleeve is selectively slidably disposable around the trailer hitch receiver;
    wherein the tightening bolt selectively secures the channel of the hitch sleeve around the trailer hitch receiver when the tightening bolt is downwardly threadably engaged within the aperture.

2. The trailer hitch step apparatus of claim 1 wherein the top surface of each of the right step member and the left step member is a diamond tread plate.

3. The trailer hitch step apparatus of claim 2 wherein the hitch sleeve, the base mounting support, the pair of step members, and the pair of side mounting supports are steel.

* * * * *